United States Patent [19]

Harley

[11] Patent Number: 5,226,808
[45] Date of Patent: Jul. 13, 1993

[54] FIXING DEVICE

[75] Inventor: David N. Harley, Bournemouth, England

[73] Assignee: Titus International Limited, Buckinghamshire, England

[21] Appl. No.: 898,877

[22] Filed: Jun. 15, 1992

[30] Foreign Application Priority Data

Jun. 18, 1991 [GB] United Kingdom ............... 9113184

[51] Int. Cl.$^5$ .......................................... F16B 19/00
[52] U.S. Cl. .................................... 411/508; 411/340
[58] Field of Search ............... 411/908, 508, 913, 509, 411/510, 351, 362, 512, 500, 504, 516, 502, 349, 340; 403/292, 297, 157; 24/297, 453

[56] References Cited

U.S. PATENT DOCUMENTS

| | | | |
|---|---|---|---|
| 2,585,285 | 2/1952 | Tonge et al. | 24/453 |
| 3,106,759 | 10/1963 | Kytta | 24/453 |
| 3,362,672 | 1/1968 | Wigam | 411/549 X |
| 3,443,783 | 5/1969 | Fisher | 411/908 X |
| 3,534,936 | 10/1970 | Knowlton | 411/908 X |
| 3,670,526 | 6/1972 | Martinetz | 411/349 X |
| 3,722,037 | 3/1973 | Jaeger . | |
| 3,908,235 | 9/1975 | Telliard et al. . | |
| 4,353,661 | 10/1982 | Ruther | 411/340 X |
| 4,493,580 | 1/1985 | Ruehl | 411/508 X |
| 4,579,494 | 4/1986 | Bierwith . | |
| 5,035,154 | 7/1991 | Jonischus | 411/508 X |

FOREIGN PATENT DOCUMENTS

| | | |
|---|---|---|
| 0260959A2 | 3/1988 | European Pat. Off. . |
| 2024508 | 12/1971 | Fed. Rep. of Germany ...... 403/292 |
| 956991 | 4/1964 | United Kingdom ............... 403/292 |
| 1348753 | 3/1974 | United Kingdom . |
| 2188976A | 10/1987 | United Kingdom . |
| 2205892A | 12/1988 | United Kingdom . |

*Primary Examiner*—Rodney M. Lindsey
*Attorney, Agent, or Firm*—Lowe, Price, LeBlanc & Becker

[57] ABSTRACT

A fixing device is described which comprises a resilient pin 10 having a leading end portion 18 comprising a single resiliently deflectable limb and is inclined relative to the pin axis. The pin 10 is used to fasten two panels together by inserting it through one panel into a bore in the other panel, this insertion being made possible by resilient deflection of the limb decreasing the inclination thereof such that the pin 10 has a substantially axial configuration. The leading end portion 18 of the pin 10 is provided with an engagement element 20 which extends in a direction substantially perpendicular to the pin axis and is arranged to engage in a hole 38 provided in the other panel by virtue of the resilience of the pin 10 tending to cause release of the deflection of the limb such that it resumes its undeflected configuration.

10 Claims, 3 Drawing Sheets

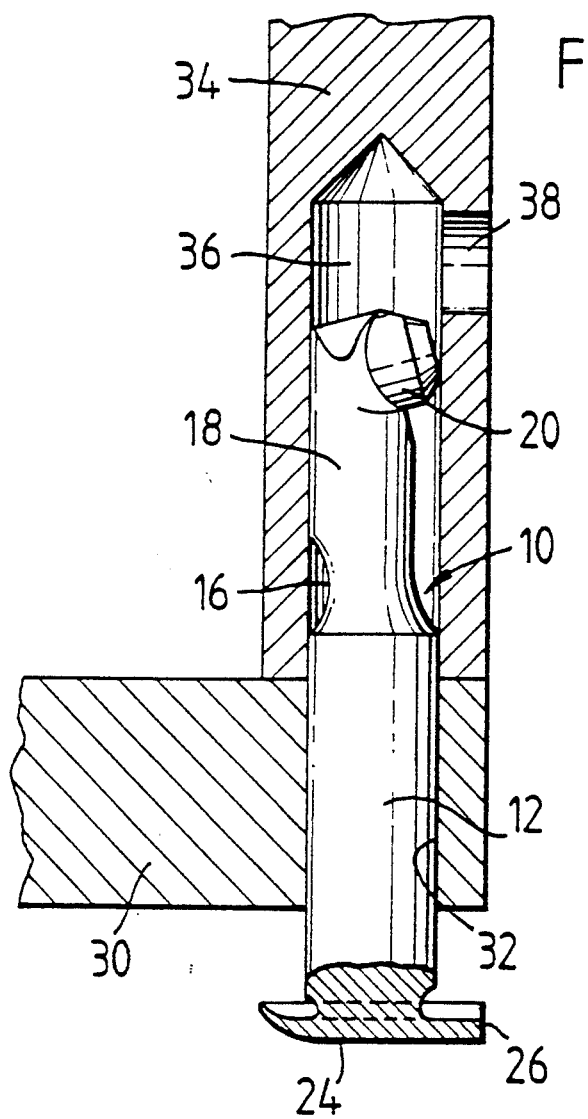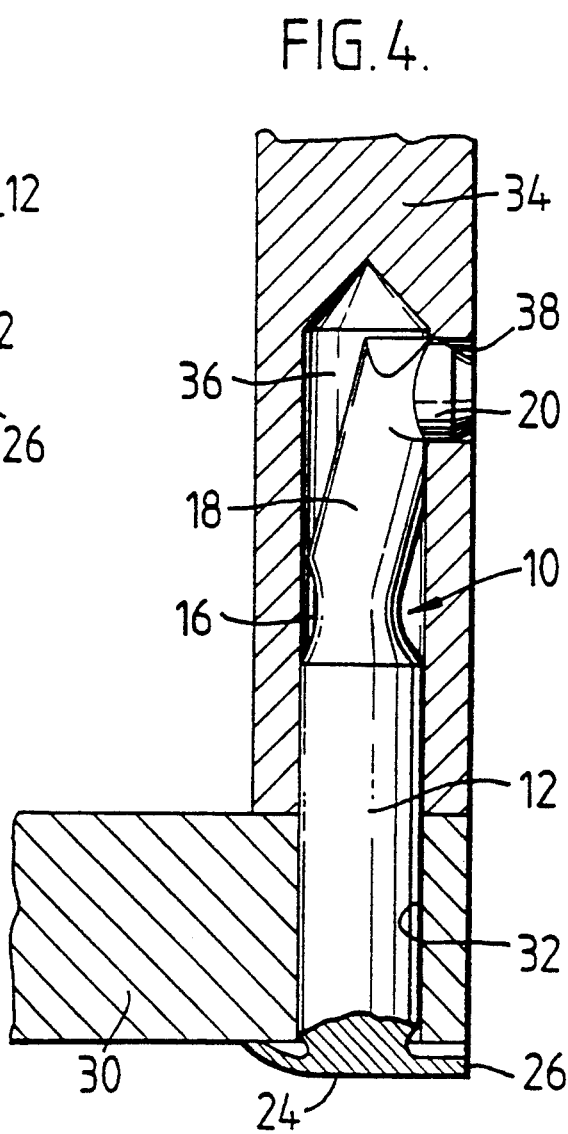

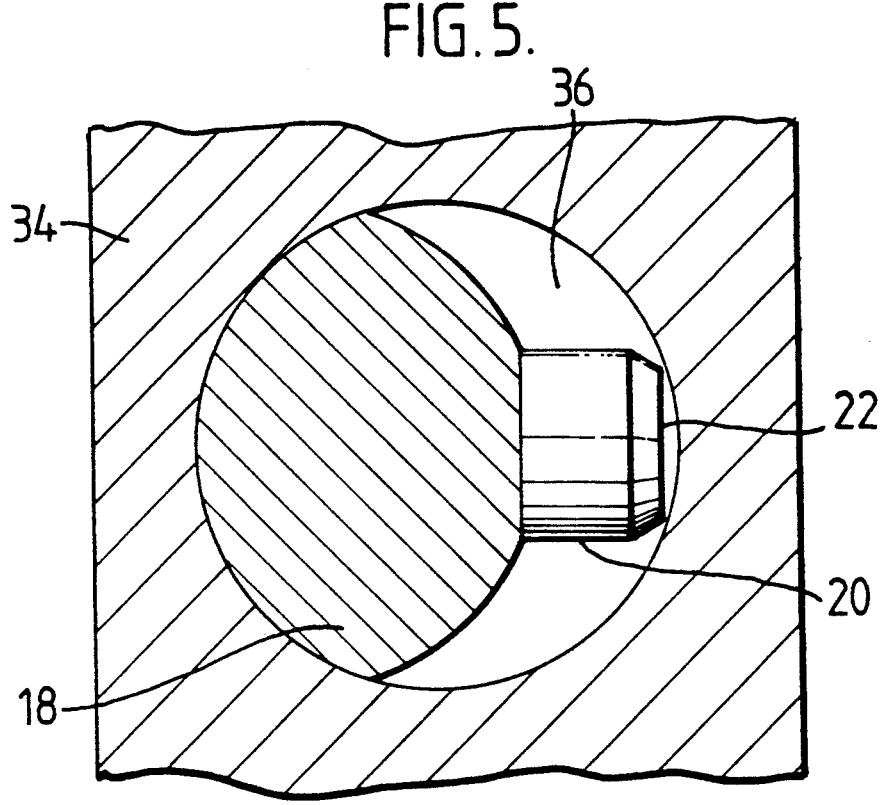
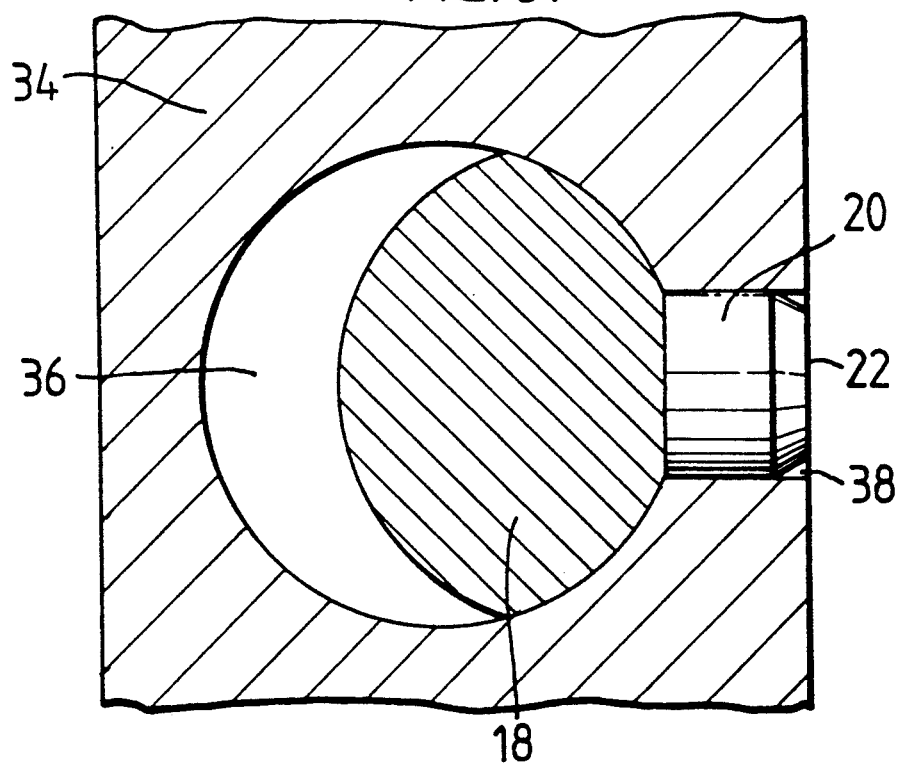

FIXING DEVICE

FIELD OF THE INVENTION

The invention relates to a fixing device suitable for securing two panels together in a predetermined angular relationship.

BACKGROUND OF THE PRIOR ART

In furniture construction it is often necessary to secure furniture panels to one another at right angles, or in other predetermined arrangements, and traditional methods of achieving this have involved the use of screws, or nails and glue. These can be time-consuming and may require considerable skill to obtain accurately positioned strong joints. In particular, when using chipboard panels screws can cause delamination or bursting, damaging the panel so that it cannot be used.

For certain applications other methods of fixing have been developed. For instance, in drawer construction it is known to cover chipboard with a vinyl wrap, formed in a long strip. V-shaped notches are cut at appropriate spacings along the strips so that they can be folded to form mitred corners, which are then secured by adhesive.

SUMMARY OF THE INVENTION

The invention aims to provide a fixing device which enables panels or other members to be secured to one another quickly and easily, requirements which are particularly important in the field of self-assembly or knock-down furniture.

Accordingly the invention provides a fixing device which can be securely fixed, by being pushed, in a bore which has a recess in the wall thereof, the device comprising a body portion adapted to fit closely in a length of the bore, and a leading end portion extending forwardly from the body portion and engageable in the recess, characterised in that the leading end portion comprises a single resiliently deflectable limb dimensioned to pass with substantial clearance into the bore and carrying an engagement element, the limb being shaped so that when it is undeformed the engagement element projects laterally relative to the body portion, whereby the leading end and body portion may be pushed into the bore with the resilient limb deflected and, by release of the deflection the engagement portion will snap into engagement with said recess.

BRIEF DESCRIPTION OF THE DRAWING

In order that the invention may be better understood an embodiment thereof will be described, by way of example, with reference to the accompanying drawings wherein:

FIG. 3 is a diagrammatic view of the fixing device of FIG. 1 partly in section, during insertion to fix two panels together;

FIG. 4 shows the arrangement of FIG. 3 when the fixing device has been fully inserted; and FIGS. 5 and 6 are sectional views through the leading end of the fixing device shown in FIGS. 3 and 4 respectively.

DETAILED DESCRIPTION OF THE INVENTION

Figure 1:
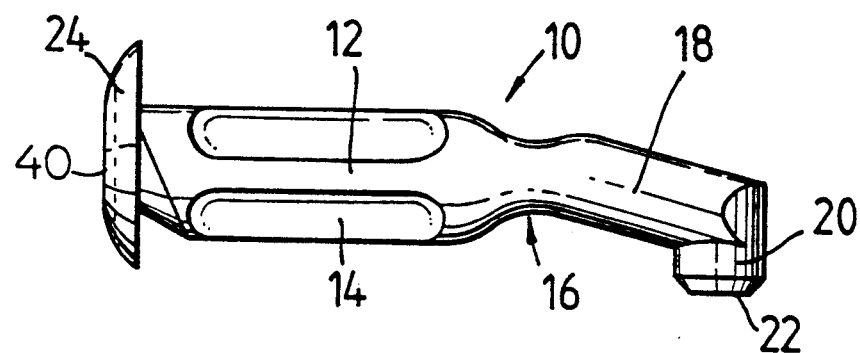
FIG. 1 is a side view of a fixing device in accordance with the invention.

Referring first to FIG. 1, a fixing device or pin 10 is shown which is formed from a resilient material such as moulded plastic. The pin 10 comprises a substantially cylindrical body portion 12 with axially-aligned cutaway flutes 14 in its surface. These simply serve to reduce the amount of material used to form the pin 10 thereby keeping the cost of its manufacture down.

At one end the body portion 12 narrows to form a neck 16 which joins a leading end portion 18 of the pin to the body portion 12. The leading end portion 18 comprises a single resiliently deflectable limb which has an oval cross-section and, as can be seen in FIG. 1, is inclined or cranked with respect to the axis of the pin 10, which coincides with the longitudinal axis of the body portion 12.

An engagement element 20 is provided at the end of the resiliently deflectable limb remote from the body portion 12. It takes the form of a short stub extending in a direction substantially perpendicular to the pin axis. The end of the stub 20 tapers slightly inwardly to a substantially flat end-face 22.

At the trailing end of the pin 10 a head 24 of larger diameter than the body portion 12 is provided. As can best be seen in FIGS. 3 and 4 the head 24 is substantially flat on its end surface with a peripheral edge which curves downwardly towards the body of the pin 10 around a major part of its circumference. The underside of the head 24 is concave and at the downwardly-curved edges the thickness of the head tapers away. The purpose of this arrangement will be explained below.

The use of the pin 10 for fixing two panels together will now be explained with reference to FIGS. 3 and 4, which illustrate the securing of two panels at right angles to one another. As can be seen, the first panel 30 has a hole 32 drilled through from one major surface to the other, close to one edge of the panel 30. The second panel 34 has a first bore 36 which has substantially the same diameter as the hole 32 and extends from an edge surface of the panel 34. This bore 36 connects with a second, smaller, bore or recess 38 substantially at right angles to it and opening at a major surface of the second panel 34.

To secure the two panels the hole 32 in the first panel 30 and the bore 36 in the second panel 34 are aligned and the pin 10 is inserted through the first panel 30 into the second panel 34. The diameters of the hole 32 and bore 36 are arranged to be sufficiently large to allow the body portion 12 of the pin 10 to pass through, but are too small to allow the pin 10 in its normal inclined or cranked configuration to enter the panels 30,34. However, the resilience of the material of the pin 10 allows it to flex at the neck 16 so that the deflectable limb of the leading end portion 18 is deflected causing a decrease in the inclination of the limb such that it becomes substantially aligned with the body portion 12, thereby allowing the pin 10 to move through the first panel 30 and into the second panel 34. As the pin 10 moves through the bore 36 the stub 20 will slide up the wall of the bore 36 whilst the surface of the leading end portion 18 on the side opposite the stub 20 also slides up the wall of the bore 36, but closely fitting the curve of the wall, as shown in FIG. 5. When the pin 10 is pushed far enough in for the end face 22 of the stub 20 to draw level with the smaller bore 38, the resilience of the pin 10 causes the resiliently deflectable limb of the leading end portion 18 of the pin to resume its inclined or cranked configuration by moving into the additional space in a snap-action whereby deflection of the limb is released, and the stub 20 is pushed into engagement in the smaller bore 38, thereby fixing the panels 30, 34 together, as shown in FIG. 4. The movement of the stub 20 into the smaller bore 38 is assisted by the tapered shape of the end of the stub which acts to draw it into alignment as it moves towards the smaller bore 38. When the stub 20 is engaged in the bore 38 the end face 22 of the stub is substantially flush with the surface of the second panel 34, and the diameter of bore 38 is chosen to give a close fit around the stub 20. In addition, the leading end portion 18 of the pin 10 is shaped so that, when the stub 20 is engaged in the smaller bore 38, that part of the leading end portion 18 surrounding the stub 20 fits closely against the walls of the bore 36, as can be seen in FIG. 6.

When the pin 10 is inserted through the first panel 30 and into the second panel 34, the head 24 will remain exposed at the surface of the first panel 30. As well as providing a neat appearance, the curved and tapered shape of the head 24 of the pin 10 provides some tolerance in the positioning of the small bore 38 relative to the edge of panel 34, and also allows for slight variations in the thickness of panel 30. This is because its tapered edges give some additional flexibility so that the pin 10 can be pushed further into the panels if necessary to achieve proper engagement of the stub 20 in bore 38. As shown in FIGS. 3 and 4 the head 24 may be provided with a flat 26 along part of its circumference which serves to indicate the orientation of the stub 20 once the pin 10 has been inserted into the panels. By aligning the flat 26 with the edge of the panel 30 the correct positioning of the stub 20 relative to the smaller bore 38 can be established. The head 24 may also be provided with a slot 40 (see FIG. 1) in its end surface to allow a screwdriver or the like to be used to turn the pin 10 to achieve this correct positioning more readily.

Figure 2:
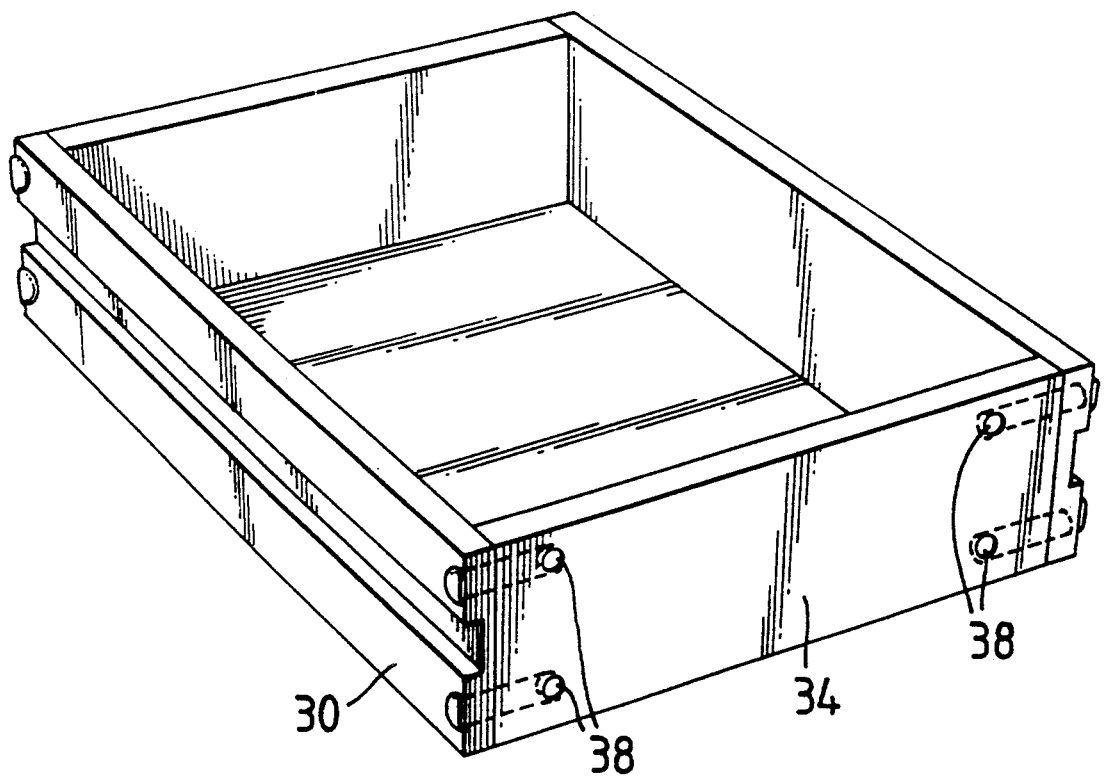
FIG. 2 is a perspective view of a drawer illustrating how the fixing device of the invention may be used in its assembly.

Turning to FIG. 2, a drawer is shown constructed from four panels held together with eight pins 10. In the arrangement illustrated the sides of the drawer, with grooves to accommodate runners, correspond to panel 34 in FIGS. 3 and 4. Thus the pins have been inserted from the sides and the peg elements 20 engage in bores 38 in the front and rear panels of the drawer. The small bores 38 in the front of the drawer would usually be covered by trim added to the drawer carcase after assembly. It will be apparent that the bores 38 could equally well be provided on the inner surface of the drawer, and the pins 10 rotated through 180°, if preferred. In this case plastic caps could be used to cover the bores 38 inside the drawer in a known manner.

Although the invention has been described in relation to its application for the assembly of drawers, it will be apparent that it provides a quick and simple means of fastening any two panels or the like to one another. It will also be appreciated that many modifications are possible within the broad ambit of the invention, and the preceding description is not intended to limit the broad scope of the invention in any way.

I claim:

1. A fixing device which can be securely fixed, by being pushed, in a bore which has a recess in the wall thereof, the device comprising a body portion adapted to fit closely in a length of the bore, and a leading end portion extending forwardly from the body portion and engageable in the recess, characterised in that the leading end portion consists of a single resiliently deflectable limb dimensioned to pass with substantial clearance into the bore and carrying an engagement element, the limb being shaped so that when it is undeformed the engagement element projects laterally relative to the body portion, whereby the leading end portion and body portion may be pushed into the bore with the resilient limb deflected and, by release of the deflection the engagement portion will snap into engagement with said recess.

2. A device as claimed in claim 1 wherein said limb is inclined relative to the body portion axis, resilient deflection causing a decrease in the inclination of said limb to facilitate insertion into said bore.

3. A device as claimed in claim 1 wherein said engagement element comprises a stub extending in a direction substantially perpendicular to the body portion axis.

4. A device as claimed in claim 3 wherein said stub tapers inwardly to a substantially flat end face.

5. A device as claimed in claim 1 wherein the limb has a substantially oval cross-section shaped to fit closely against a wall of the bore.

6. A device as claimed in claim 1 wherein a substantially flat head is provided at a trailing end thereof.

7. A device as claimed in claim 6 wherein a deformable peripheral portion of the head is tapered and curves towards the body portion.

8. A device as claimed in claim 6 wherein a flat edge is provided on the head to indicate the orientation of the engagement element relative thereto.

9. A device as claimed in claim 6 wherein a slot is provided in the head to enable the device to be rotated by a tool.

10. A device as claimed in claim 1 made of moulded plastic.

* * * * *